March 28, 1950 C. DUMBLETON ET AL 2,501,765
CONVEYER OVEN
Filed April 25, 1945 5 Sheets-Sheet 1

Inventors
C. Dumbleton
D. Gunston

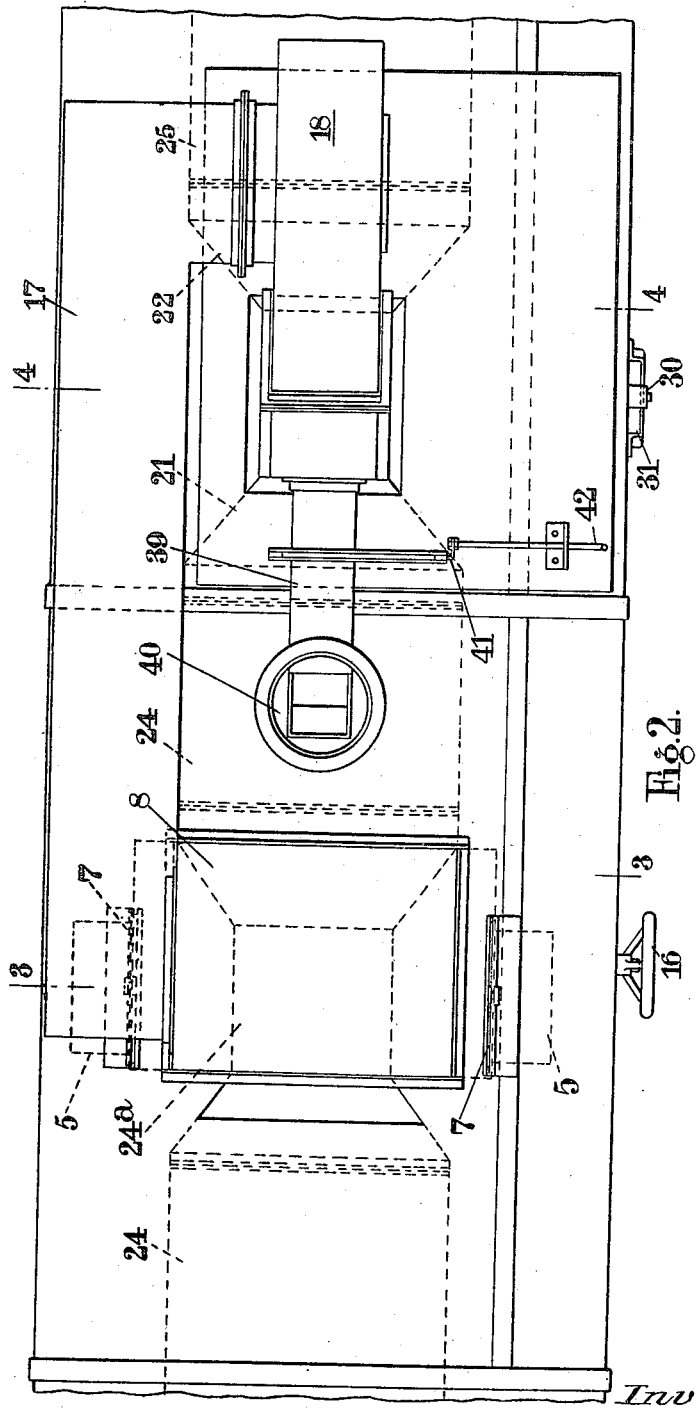

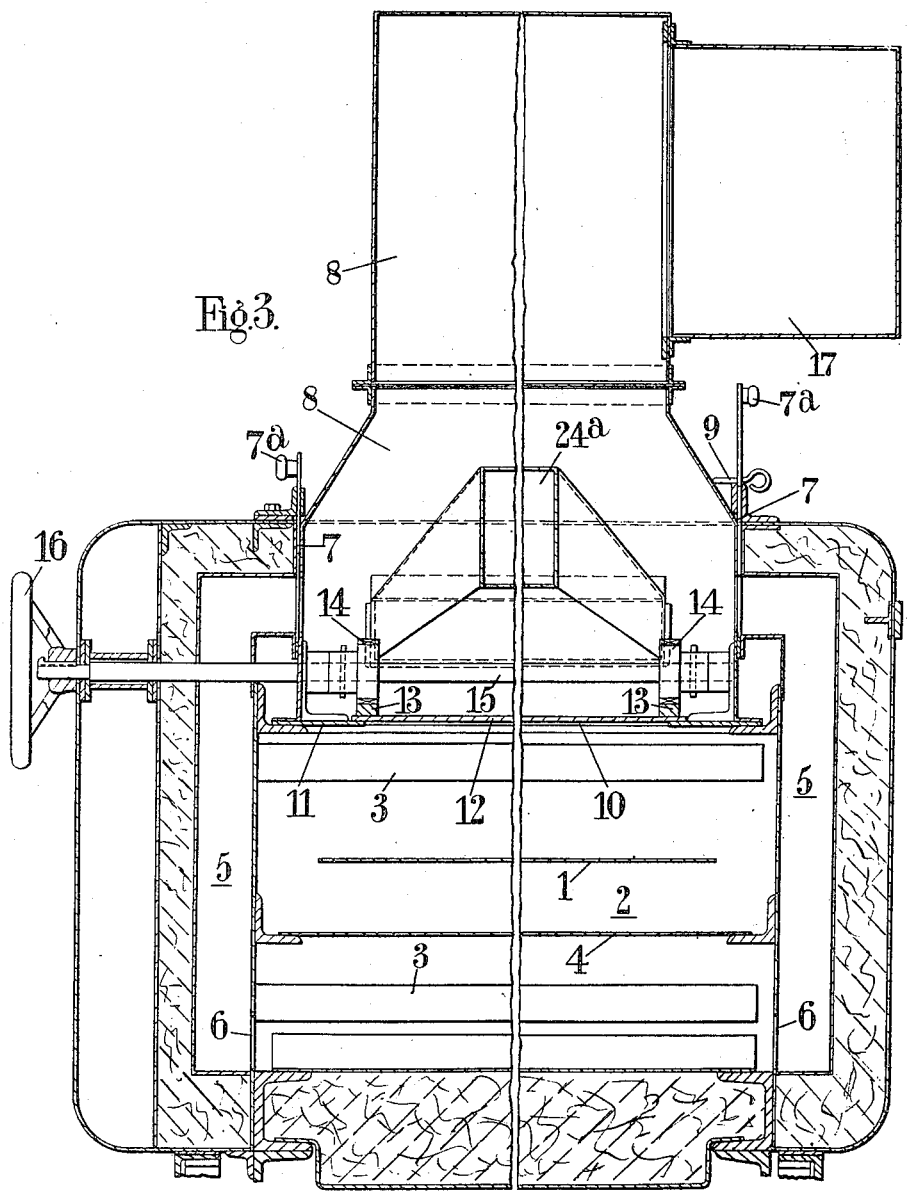

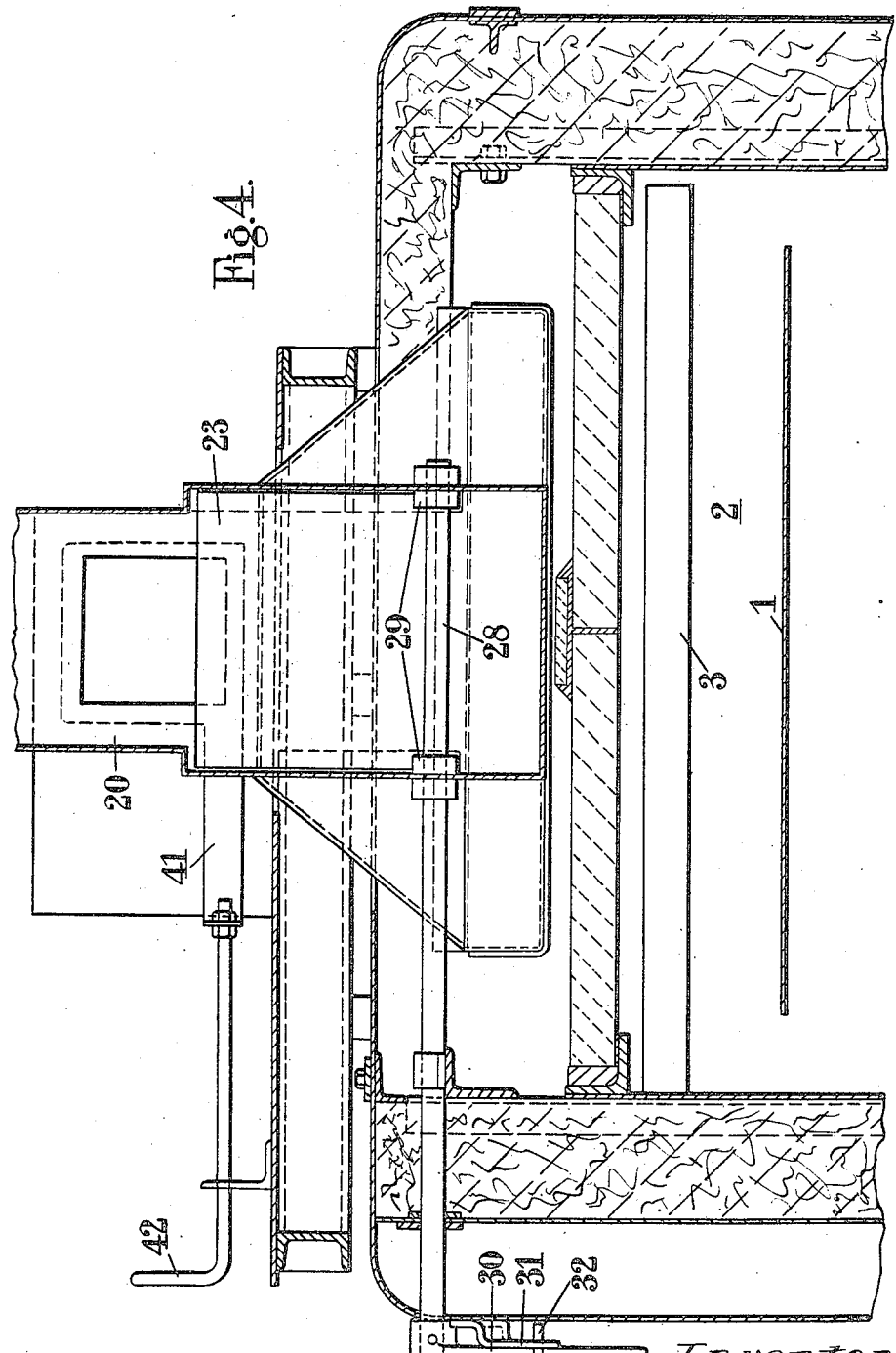

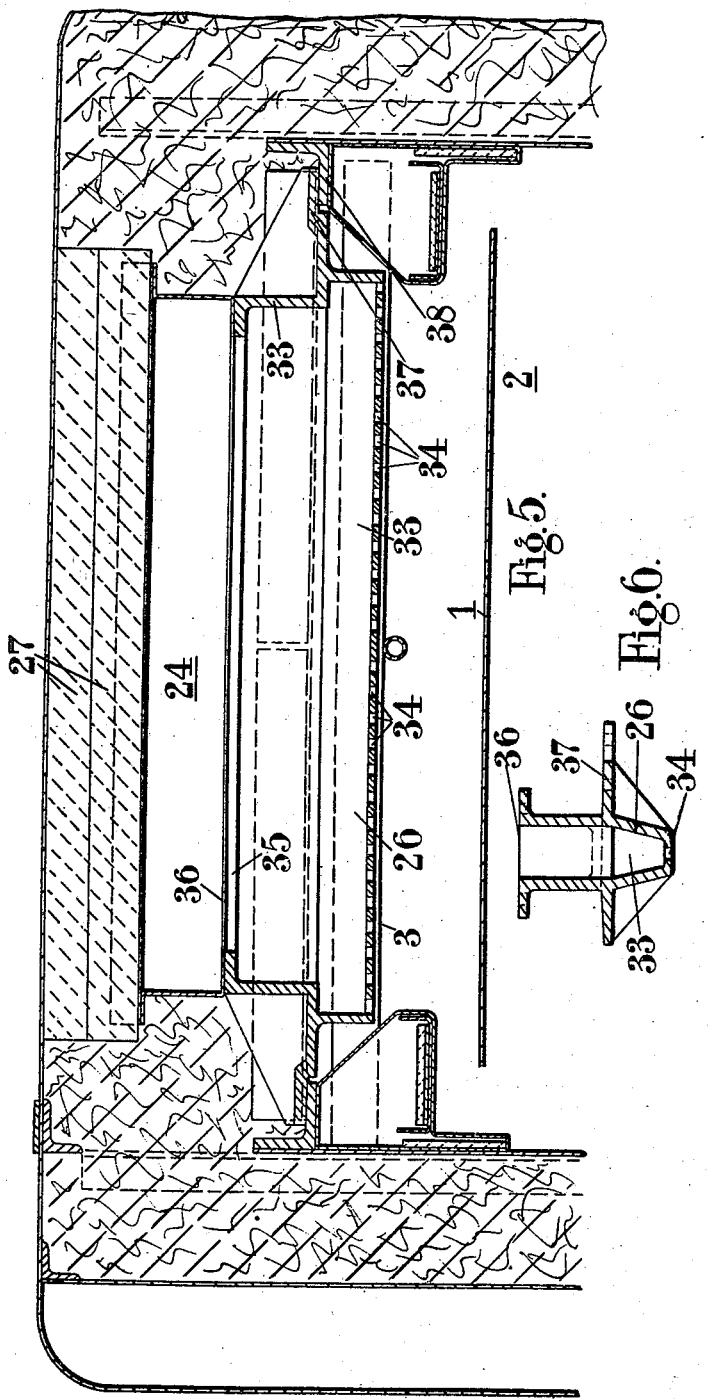

Patented Mar. 28, 1950

2,501,765

UNITED STATES PATENT OFFICE 2,501,765

CONVEYER OVEN

Claude Dumbleton and David Gunston, Westwood Works, Peterborough, England, assignors to Baker Perkins Limited, Peterborough, England Application April 25, 1945, Serial No. 590,246
In Great Britain May 12, 1944

7 Claims. (Cl. 107—57)

This invention relates to conveyor ovens, more particularly bakers ovens or biscuit ovens, or other ovens employing a tray or band or other conveyor, of the type wherein the heating means are of the character generally known as "direct" such as gas burners or electric elements, which are arranged internally of the oven to provide top and/or bottom heat.

In gas-fired ovens of the kind in question the products of combustion and oven gases are allowed to escape to the atmosphere with a consequent and corresponding loss of heat. Moreover, in gas and electrically fired ovens stagnation of the oven atmosphere is liable to occur and undesirable "hot spots" in various localities may arise. Furthermore, in ovens of this character it may be desired to provide auxiliary heat other than by means of adjustment of the burners or heating elements.

An aim of the present invention is to avoid the above objections or to fulfil the requirements necessary to approach ideal baking conditions while providing for flexibility in treatment of the baked product.

The invention consists in circulating the atmosphere or gases of a directly heated oven as specified above by extracting or withdrawing a proportion of the oven atmosphere or gases from one (or more) localities within the oven by a fan or blower and reintroducing such (or a proportion thereof) into the oven chamber with a view to causing conservation of heat, an organized circulation or turbulence, a supply of auxiliary baking heat and/or the redistribution of heat and avoidance of "hot spots."

The invention also consists in an oven plant of the type described comprising a suction conduit or trunk (or a plurality thereof) having an opening or openings into the oven chamber or into a predetermined internal zone (or zones) of the oven, a fan or blower connected to the suction conduit or trunk, a delivery conduit or trunk to which the fan discharges having nozzles or outlets distributed over the oven chamber or located to direct the fan discharge (or a proportion thereof) to a predetermined internal zone (or zones) of the chamber, and means for controlling the quantity of the suction intake (or intakes) and preferably means for controlling and/or directing the fan discharge.

In the accompanying drawings—

Figure 1:
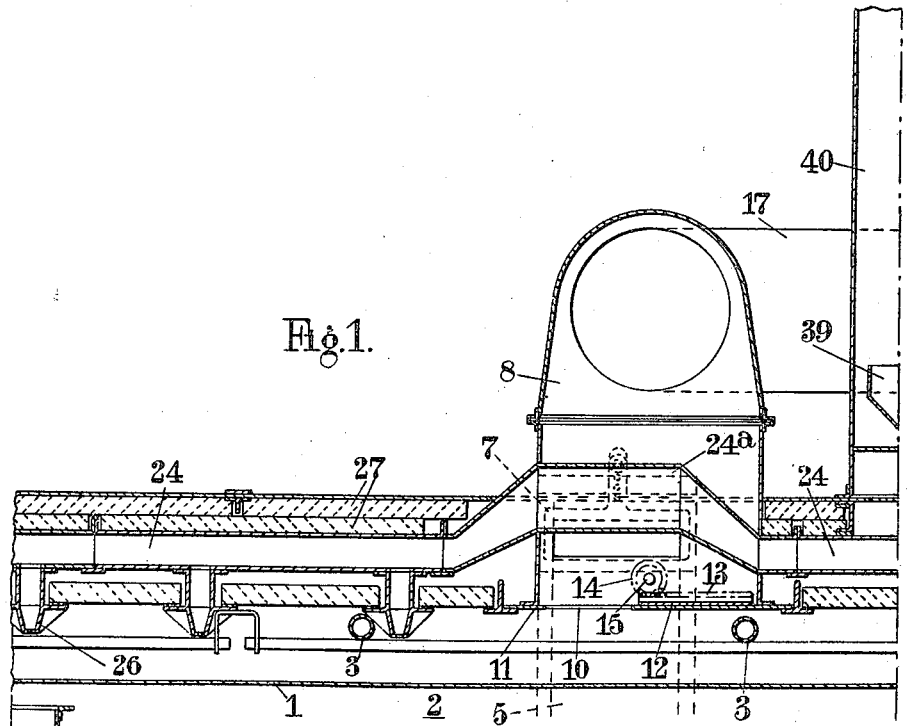
Figure 1A:
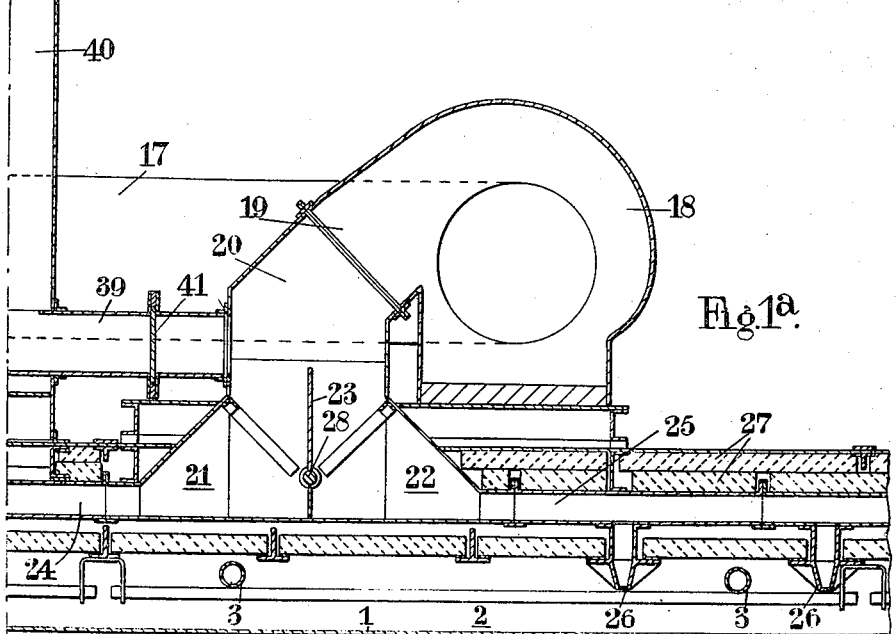

Figures 1 and 1a together comprise a sectional elevation of the central part of an oven, Figure 2 is a part plan, Figure 3 is a cross-section on 3—3 of Figure 2, Figure 4 is a cross-section on 4—4 of Figure 2, Figure 5 is a cross-section through part of the oven chambers at a nozzle, and Figure 6 is a cross-section of the nozzle.

In carrying the invention into effect according to one convenient mode, as described by way of example as applied to a biscuit oven of the tunnel type having an endless tray or band conveyor or oven sole 1, traversing the gas-heated tunnel and/or chamber 2 in a single pass, gas burners 3 of any suitable type provided with their own air supply adequate to support complete combustion, are located transversely and/or longitudinally of the oven and suitably distributed according to any known arrangement to provide top and/or bottom heat. As usual in ovens of this kind the underside of the conveyor 1 is screened, either partially or wholly by a baffle or plate 4 so as to divide the chamber longitudinally.

In the central region or in any other predetermined position lengthwise of the oven, a vertical or other suitably disposed conduit 5 is arranged adjacent each side wall, or a plurality of conduits are arranged adjacent each side wall. Each conduit 5 opens into the oven through an opening 6 in the wall so that a proportion of the oven atmosphere may be withdrawn from below the screen.

Dampers may be provided for controlling these outlets or openings 6 from the oven either individually or in pairs or in any other predetermined groups, but it is preferred to provide control dampers 7 at the upper ends of the conduits 5 where they open into a collecting box 8 mounted on the roof of the oven. The dampers 7 comprise vertically slidable plates manually operable by knobs 7a and having a series of holes engageable by a pin 9 whereby they may be retained in their adjusted position to control the amount of gases passing through the ducts or conduits 5.

The collecting box 8 is mounted over an aperture 10 in the roof of the oven and through which gases may be drawn from the upper part of the oven chamber above the baffle 4. The aperture 10 formed in a plate 11 is controllable by a sliding damper or plate 12 so that the amount of top-heat gases being drawn off may be adjusted.

The damper 12 has fixed thereto a pair of racks 13 with which gear wheels 14 on a spindle 15 mesh. The spindle 15 extends through the wall of the oven and is provided with a hand wheel 16.

The collecting box 8 is coupled by a conduit 17 to the suction chamber of a suitable fan or blower 18 which is located above the oven chamber or in any other suitable position. The fan may be driven by an electric motor or from any suitable power distribution shaft.

The outlet 19 from the fan 18 discharges into a conduit 20 having a forked portion 21, 22 provided with a valve flap or damper device 23 in order that the discharge from the fan may be directed exclusively along one forked branch or the other, or the valve or damper 23 may afford control so that a proportion of the discharge may travel along each branch. The damper 23 is mounted upon a spindle 28 supported in bearings 29 and extending through the insulation of the oven wall. At its outer end the spindle 28 is provided with a handle 30 movable over a quadrant 31 having a series of holes for the reception of a pin 32. The branches 21, 22 are connected to independent trunks 24, 25 arranged longitudinally of the oven, preferably along or adjacent the roof thereof, and the trunks each have a suitable number of outlets or nozzles 26 entering the oven chamber, preferably in the roof and between the refractory roof lining tiles 27.

The effect of withdrawing products of combustion and general oven atmosphere from the oven and returning such to the oven chamber not only effects conservation of heat so that heat losses are reduced but produces a general circulation of the oven atmosphere and even distribution of baking qualities.

Although usually it will not be necessary, in some circumstances the nozzles or inlets 26 to the oven chamber from the trunks 21, 22 may be controlled individually or in groups by dampers or valve means so that the reintroduction of the extracted products of combustion may be redirected to chosen parts or localities of the oven.

Where there is a liability of the formation of "hot spots" or undesirable stagnant conditions the trunks 24 and 25 may have branches which lead the returning products of combustion into these localities so as to create a local circulation or turbulence effect. Similarly, in order to provide additional or alternative control, such localities may be served by suction branches for withdrawing products of combustion from such spots or localities.

The invention may be similarly carried into effect with reference to electrically heated ovens and the invention is applied in such case to the creation of circulation or the creation of local or general turbulent effects so that an even distribution of heat may be attained on the one hand, or if desired an auxiliary baking atmosphere may be applied in selected zones.

In each case the distributing nozzles or inlets 26 to the oven for the recirculated products of combustion or returning oven atmosphere may be in the form of transverse boxes or compartments 33 having a series of perforations 34, or slots or orifices for the distribution of the gases. At their upper parts the nozzles are provided with openings 35 registering with openings 36 in the trunks 24, 25. The nozzles have flanges 37 at their ends for supporting them upon angles 38 at the sides of the oven chamber.

The trunk 24 passes through the collecting box 8 and has a reduced raised portion 24a to avoid masking the opening 10 in the roof of the oven and the openings from the conduits 5.

On the discharge side of the fan a by-pass conduit 39 is provided whereby a suitable quantity of the products of combustion may be discharged to a chimney 40. The conduit 39 is provided with a sliding damper 41 operable by a handle 42.

The recirculation of hot gases and the return of heat units which would be otherwise lost to atmosphere, enables the burner heat to be reduced as well as causing turbulence and avoidance of stagnation and also affords dispersal of heat to particular zones or parts of the oven.

We claim:

1. A baker's oven comprising a chamber having side walls and a roof, means extending between the side walls and dividing the chamber into upper and lower compartments, said means preventing direct communication between said compartments direct heating means in both of said compartments respectively providing top and bottom heat, an endless travelling conveyor having a lap disposed in said upper compartment beneath the heating means therein, a collecting box mounted upon the roof of the oven, upwardly extending conduits adjacent each side wall of the oven exteriorly thereof and opening into the lower compartment and into said collecting box, adjustable damper means for said conduits, a fan the inlet of which is coupled to said collecting box, a delivery conduit located in said upper compartment, the discharge of the fan being connected to the delivery conduit, said delivery conduit having a plurality of outlets distributed over the upper compartment and in communication therewith.

2. A baker's oven as claimed in claim 1, wherein the upper compartment communicates with the collecting box by an opening in the roof of said compartment, damper means being provided for controlling said opening.

3. A conveyor oven as claimed in claim 1, wherein the delivery conduit comprises trunking arranged adjacent the roof of the upper compartment and longitudinally of the oven, the discharge of the fan being connected midway of the length of the trunking and adjustable damper means in the trunking at said midway position to control the passage of the fan discharge along the trunking, the arrangement being such that flow may take place along either or both parts of the trunking.

4. A conveyor oven as claimed in claim 1, wherein the delivery conduit comprises trunking arranged adjacent the roof of the upper compartment and longitudinally of the oven, the discharge of the fans being connected midway of the length of the trunking, adjustable damper means controlling the passage of the fan discharge along the halves of the trunking, said outlets being longitudinally spaced along the trunking and extending transversely thereof.

5. A conveyor oven comprising a chamber having side walls and a roof, means extending between the side walls and dividing the chamber into upper and lower compartments, said means preventing direct communication between said compartments gas burners in both of said compartments and respectively providing top and bottom heat, an endless travelling conveyor having a lap disposed in said upper compartment beneath the burners therein, vertical conduits adjacent each side wall of the oven exteriorly thereof and opening into the lower chamber, a collecting box mounted upon the roof of the oven, said conduits opening at their upper ends into said collecting box, dampers controlling the upper ends of said conduits, a damper controlled opening in the roof of the oven providing communication between the upper chamber and said collecting box, a fan the inlet of which is coupled to the collecting box, trunking located in the upper chamber adjacent the roof thereof, and extending longitudinally of the oven, a connection between the discharge of the fan and said trunking at a point midway thereof, outlets from said trunking into the upper chamber, said outlets being longitudinally spaced along the trunking and extending transversely of the oven, and adjustable damper means controlling the discharge of the fan along the trunking.

6. A baker's oven comprising a chamber having side walls and a roof, means extending between the side walls and longitudinally of the chamber and dividing the oven into upper and lower compartments, said means preventing direct communication between said compartments, an endless travelling conveyor having a lap disposed in said upper compartment, direct heating means in said upper compartment above said lap providing top heat, direct heating means in said lower compartment providing bottom heat, a collection box disposed on the roof of said oven, damper controlled conduits extending between the lower compartment and said collection box, said upper compartment having a damper controlled opening therein communicating with said collection box, a circulating impeller, means providing communication between said collection box and the inlet of said impeller, longitudinally disposed conduits extending transversely of the upper compartment and above the heating means therein, a damper controlled communication between said conduit and the discharge side of said impeller, and a plurality of longitudinally spaced outlet nozzles extending between said delivery conduit and the upper compartment.

7. A baker's oven as defined in and by claim 6, whereby said delivery conduit extends over said damper controlled opening in the roof of said upper compartment and that portion of said conduit above said opening having less cross sectional area than that of the opening so as not to interfere with the flow of gases from the upper compartment into the collection box.

CLAUDE DUMBLETON.
DAVID GUNSTON.

REFERENCES CITED

The following references are of record in the file of this patent:

UNITED STATES PATENTS

| Number | Name | Date |
|---|---|---|
| 1,445,690 | Ihlee | Feb. 20, 1923 |
| 1,697,357 | Houlis | Jan. 1, 1929 |
| 1,732,262 | Dumbleton | Oct. 22, 1929 |
| 1,860,887 | Buysse | May 31, 1932 |
| 1,946,843 | Elliott | Feb. 13, 1934 |
| 2,236,085 | Cook | Mar. 25, 1941 |

FOREIGN PATENTS

| Number | Country | Date |
|---|---|---|
| 504,950 | Great Britain | May 3, 1939 |
| 626,349 | Germany | Feb. 24, 1936 |
| 668,188 | Germany | Nov. 28, 1938 |
| 695,815 | Germany | Sept. 3, 1940 |